(12) United States Patent
Takii

(10) Patent No.: US 9,195,371 B2
(45) Date of Patent: Nov. 24, 2015

(54) INFORMATION PROVIDING APPARATUS, INFORMATION PROVIDING SYSTEM AND INFORMATION PROVIDING METHOD

(71) Applicants: Kizunasystem Co., Ltd., Tokyo (JP); Hisashi Hodumi, Akita (JP)

(72) Inventor: Tatsuko Takii, Tokyo (JP)

(73) Assignees: ASAHIKIKOU Co., Ltd. (JP); Hisashi Hodumi (JP)

( * ) Notice: Subject to any disclaimer, the term of this patent is extended or adjusted under 35 U.S.C. 154(b) by 0 days.

(21) Appl. No.: 14/290,041

(22) Filed: May 29, 2014

(65) Prior Publication Data

US 2014/0266981 A1 Sep. 18, 2014

Related U.S. Application Data

(63) Continuation of application No. PCT/JP2013/058088, filed on Mar. 21, 2013.

(30) Foreign Application Priority Data

Mar. 23, 2012 (JP) .................................. 2012-068421

(51) Int. Cl.
*G09G 5/00* (2006.01)
*G06F 3/0482* (2013.01)
(Continued)

(52) U.S. Cl.
CPC ............ *G06F 3/0482* (2013.01); *G06F 3/1454* (2013.01); *G06F 13/00* (2013.01); *G06Q 10/10* (2013.01); *G06Q 30/02* (2013.01)

(58) Field of Classification Search
CPC ... G06F 3/1431; G06F 3/1454; G06F 3/1423; G06F 3/1438; G06F 3/147; G06F 3/14; G06F 3/0482

USPC ................................... 345/1.1–3.4, 204–215
See application file for complete search history.

(56) References Cited

U.S. PATENT DOCUMENTS 6,278,993 B1 * 8/2001 Kumar et al. ................. 707/708
6,285,998 B1 * 9/2001 Black et al.
(Continued)

FOREIGN PATENT DOCUMENTS

JP 2002-245212 A 8/2002
JP 2003-115008 A 4/2003
(Continued)

OTHER PUBLICATIONS

International Search Report for International Application No. PCT/JP2013/058088 dated Apr. 16, 2013 with English Translation (5 pages).

(Continued)

*Primary Examiner* — Vijay Shankar
(74) *Attorney, Agent, or Firm* — Harness, Dickey & Pierce, P.L.C.

(57) ABSTRACT

A user information storing unit stores user information regarding a user in association with user identification information. A provision information storing unit stores various kinds of provision information to be provided to a user terminal. An image producing unit acquires the user information stored in the user information storing unit in association with the user identification information. The image producing unit acquires provision information associated with the acquired user information, from the provision information storing unit. The image producing section produces screen information for displaying the acquired provision information. A transmitting-receiving unit transmits the produced screen information to the user terminal.

5 Claims, 8 Drawing Sheets

(51) Int. Cl.
*G06F 13/00* (2006.01)
*G06Q 30/02* (2012.01)
*G06Q 10/10* (2012.01)
*G06F 3/14* (2006.01)

(56) References Cited

U.S. PATENT DOCUMENTS 6,314,420 B1 * 11/2001 Lang et al.
2002/0078054 A1 * 6/2002 Kudo et al. .................... 707/10

FOREIGN PATENT DOCUMENTS

| | | | |
|---|---|---|---|
| JP | 2003-122783 | A | 4/2003 |
| JP | 2003-310560 | A | 11/2003 |
| JP | 2005-228012 | A | 8/2005 |
| JP | 2008-276710 | A | 11/2008 |
| JP | 2010-244091 | A | 10/2010 |

OTHER PUBLICATIONS

International Preliminary Report on Patentability for PCT/JP2013/058088 dated Oct. 2, 2014 with English translation (7 pages).

* cited by examiner

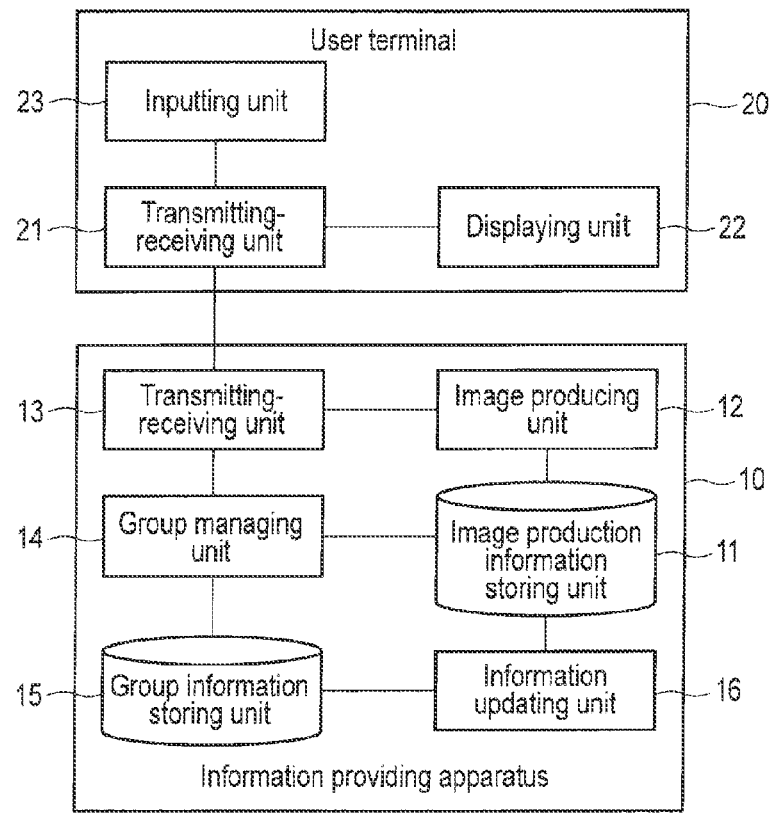

INFORMATION PROVIDING APPARATUS, INFORMATION PROVIDING SYSTEM AND INFORMATION PROVIDING METHOD

CROSS REFERENCE TO RELATED APPLICATIONS

This application is a Continuation Application of PCT Application No. PCT/JP2013/058088, filed Mar. 21, 2013 and based upon and claiming the benefit of priority from prior Japanese Patent Application No. 2012-068421, filed Mar. 23, 2012, the entire contents of all of which are incorporated herein by reference.

BACKGROUND OF THE INVENTION

1. Field of the Invention

The present invention relates to an information providing apparatus, an information providing system and an information providing method.

2. Description of the Related Art

As a phenomenon that has emerged in recent years, it is found that for various reasons, e.g., senior citizens are forced to leave areas where they have lived for many years, and relocate to unfamiliar areas.

After having relocated, senior citizens require, for example, information about the areas where they lived for many years or the areas where they have started to live. However, few such elderly people are able to handle, e.g., personal computers (PCs), and so a large number of senior citizens cannot obtain information by themselves.

In view of the above, it can be considered as a system to provide such users as senior citizens with user terminals aimed at the users, and send various kinds of information to the user terminals.

CITATION LIST

Patent Literature

Patent Literature 1: Jpn. Pat. Appln. KOKAI Publication No. 2008-276710
Patent Literature 2: Jpn. Pat. Appln. KOKAI Publication No. 2010-244091

BRIEF SUMMARY OF THE INVENTION

Technical Problem

If identical information is provided to all multiple users through user terminals, there is a case where the information does not contain a desired information item for a particular user or users.

Also, even though information provided to a user contains a desired information item, the user cannot easily search for the desired information item.

Further, although it is possible to provide only the desired information item to the user by changing the setting of the user terminal, it is hard to change the setting of the user terminal if the user is, e.g., a senior citizen.

Furthermore, in the case where the setting is changed by an administrator, the settings of all the user terminals will be changed in the same manner; that is, they cannot be changed individually.

In view of the above, the object of the present invention is to provide an information providing apparatus, an information providing system and an information providing method, which can provide a desired information item to a user.

Solution to problem

An embodiment of the present invention provides an information providing apparatus to be connected with a user terminal for use by a user to communicate with the user terminal, which is characterized by comprising: a user information storing unit configured to store user information regarding the user in association with user identification information for identifying the user; a provision information storing unit configured to store various kinds of provision information to be provided to the user terminal; a first acquiring unit configured to acquire, in response to a request from the user, the user information which is stored in the user information storing unit in association with the user identification information; a second acquiring unit configured to acquire provision information associated with the acquired user information from the provision information storing unit; a producing unit configured to produce screen information for displaying the provision information acquired by the second acquiring unit; and a transmitting unit configured to transmit the produced screen information to the user terminal to cause the screen information to be displayed by the user terminal.

Another embodiment of the present invention provides an information provision system which comprises a user terminal for use by a user and an information providing apparatus to be connected to the user terminal to communicate therewith, and is characterized in that the information providing apparatus comprises: a user information storing unit configured to store user information regarding the user in association with user identification information to be provided to the user terminal; a provision information storing unit configured to store various kinds of provision information to be provide to the user terminal; a first acquiring unit configured to acquire, in response to a request from the user, the user information which is stored in the user information storing unit in association with user identification information for identifying the user; a second acquiring unit configured to acquire provision information associated with the acquired user information, from the provision information storing unit; a producing unit configured to produce screen information for displaying the provision information acquired by the second acquiring unit; and a transmitting unit configured transmit the produced screen information to the user terminal, and also that the user terminal comprises: a receiving unit configured to receive the transmitted screen information; and a displaying unit configured to display the received screen information.

A further embodiment of the present invention provides an information providing method executed by an information providing apparatus which is to be connected to a user terminal for use by a user to communicate with the user terminal, and which comprises a user information storing unit configured to store user information regarding the user in association with user identification information for identifying the user, and a provision information storing unit configured to store various kinds of provision information to be provided to the user terminal, the information providing method being characterized by comprising: acquiring, in response to a request from the user, the user information which is stored in the user information storing unit in association with the user identification information for identifying the user; acquiring provision information associated with the acquired user information, from the provision information storing unit; producing screen information for displaying the acquired provision information; and transmitting the produced screen information to the user terminal to cause the screen information to be displayed by the user terminal.

Advantage of Invention

The present invention enables desired information for a user to be provided to the user.

BRIEF DESCRIPTION OF THE SEVERAL VIEWS OF THE DRAWING

FIG. 1 is a block diagram primarily showing a function structure of an information providing system according to a first embodiment of the present invention;

FIG. 2 shows an example of a data structure of a user information storing unit included in an image production information storing unit 11 as shown in FIG. 1;

FIG. 3 is a view showing an example of a data structure of a group information storing unit 15 as shown in FIG. 1;

DETAILED DESCRIPTION OF THE INVENTION

Figure 4:
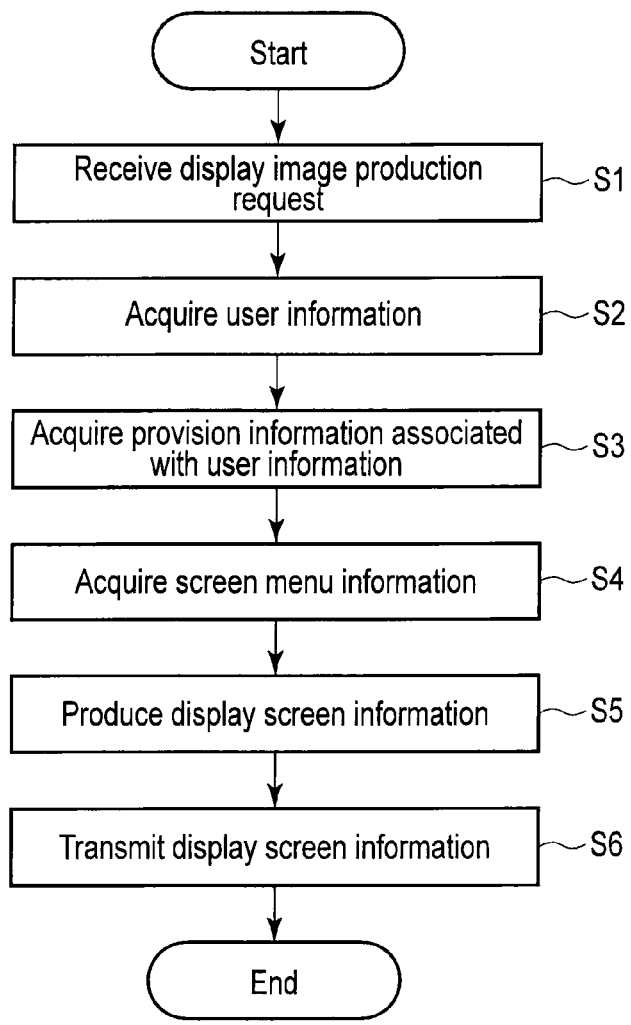
FIG. 4 is a flowchart showing a procedure of a display image production processing to be executed by an information providing apparatus 10 provided in the information providing system according to the first embodiment.

Embodiments of the present invention will be explained with reference to the accompanying drawings.

First Embodiment

FIG. 1 is a block diagram primarily showing a function structure of an information providing system according to a first embodiment of the present invention.

The information providing system according to the first embodiment is used to provide various information items to users such as senior citizens.

As shown in FIG. 1, the information providing system according to the first embodiment comprises an information providing apparatus 10 and a number of user terminals 20. Although the user terminals 20 are used by a number of users to which the various information items are provided, FIG. 1 shows only one user terminal 20 as a matter of convenience for explanation.

It should be noted that the information providing apparatus 10 and the user terminal 20 are achieved as hardware structures or structures obtained by combining hardware and software. The software comprises a program installed in advance from a network or a storage medium and provided to fulfill functions.

The information providing apparatus 10 comprises an image production information storing unit 11, an image producing unit 12, a transmitting-receiving unit 13, a group managing unit 14, a group information storing unit 15 and an information updating unit 16.

The image production information storing unit 11 stores information for use in producing screen information to be displayed by the above user terminal 20. The image production information storing unit 11 comprises a user information storing unit, a provision information storing unit and a screen menu information storing unit.

The user information storing unit stores user identification information (which will hereinafter be referred to as user IDs) for identifying a number of users who use a number of user terminals 20, respectively, and information regarding the users (which will hereinafter be referred to as user information). The user information stored in the user information storing unit includes, e.g., the name, age, sex, present address, previous address and hobby of each user.

The provision information storing unit stores various kinds of provision information to be provided to the user terminals 20 (the users using the user terminals 20). The provision information stored in the provision information storing unit includes, e.g., administration information, area information and hobby information. The administration information included in the provision information includes administration information regarding, e.g., each of municipalities. Also, the area information in the provision information includes area information regarding each of the municipalities, and the hobby information in the provision information includes information regarding each of hobbies.

The screen menu information storing unit stores information regarding a screen menu (which will hereinafter be referred to as screen menu information) to be displayed on a screen of a user terminal 20. The screen menu information stored in the screen menu information storing unit includes information (common screen menu information) for displaying a screen menu item (common screen menu item) to be displayed in common by the user terminals 20 for use by all the users, and also information (personal screen menu information) regarding a screen menu item (personal screen menu item) to be displayed in accordance with user information regarding a user as described later.

In response to a request from a user using a user terminal 20, the image producing unit 12 acquires user information stored in the user information storing unit in association with user identification information for identifying the user. Also, the image producing unit 12 acquires provision information associated with the acquired user information, from the provision information storing unit.

The image producing unit 12 produces screen information (hereinafter referred to as display screen information) for displaying the acquired provision information with the user terminal 20, based on the screen menu information stored in the screen menu information storing unit. Thereby, the image producing unit 12 produces display screen information for the user. The display screen information produced by the image producing unit 12 includes a common screen menu item and a personal screen menu item for displaying the acquired provision information with the user terminal 20.

The transmitting-receiving unit 13 is a function unit configured to transmit and receive various information to and from a plurality of user terminals 20. The transmitting-receiving unit 13 transmits the display screen information produced by the image producing unit 12 (the display screen information for the user) to the user terminal 20 of the user in order for the display screen information to be displayed by the user terminal 20 for use by the user.

The group managing unit 14 organizes a group to which a number of users belong, based on the user information stored in the user information storing unit included in the image production information storing unit 11. For example, the group managing unit 14 organizes a group to which a number of users belong, who are identified by user IDs stored in the user information storing unit in association with common user information.

The group managing unit 14 stores (registers) group identification information (hereinafter referred to as group ID) for identifying a determined group and user IDs for identifying users belonging to the group, in the group information storing unit 15.

Also, the group managing unit 14 delivers information which is posted, for example, from a user to a group (and which will hereinafter be referred to as posting information) as described later, to user terminals 20 for use by users belonging to the group, through the transmitting-receiving unit 13. The posting information is stored in the provision information storing unit in order that it be used as, e.g., provision information.

The information updating unit 16 changes (updates) various information (user information and provision information) stored in the user information storing unit and provision information storing unit included in the image production information storing unit 11, in response to an operation by, e.g., an administrator. The administrator can perform an operation associated with the above change through a control center (not shown) connected to the information providing apparatus 10. Furthermore, the information updating unit 16 can also change information stored in the group information storing unit 15 in response to an operation by the administrator.

A user terminal 20 (each of the above user terminals 20) includes a tablet terminal comprising a display unit such as a liquid crystal panel and an input device which is operated by pushing (designating) any of indications on its screen. The user terminal 20 further comprises a transmitting-receiving unit 21, a displaying unit 22 and an inputting unit 23.

The transmitting-receiving unit 21 is a function unit configured to transmit and receive various information to and from the information providing apparatus 10. The transmitting-receiving unit 21 receives the display screen information transmitted by the transmitting-receiving unit 13 included in the information providing apparatus 10 (display screen information for the user using the user terminal 20).

The displaying unit 22 displays the display screen information received by the transmitting-receiving unit 21. Thereby, the above common screen menu item and the personal screen menu item for displaying the provision information associated with the user information regarding the user using the user terminal 20 are displayed on the screen of the user terminal 20.

In response to an operation by the user on the screen of the user terminal 20 on which the display screen information is displayed by the displaying unit 22, the inputting unit 23 inputs (acquires) location information (hereinafter referred to as screen location information) of a screen menu item in the image displayed on the screen, which is designated by the user.

In this case, based on the acquired screen location information, the user terminal 20 displays provision information associated with the screen menu item designated by the user (provision information associated with the screen menu item designated by the user).

FIG. 2 shows an example of a structure of data in the user information storing unit included in the image production information storing unit 11 as shown in FIG. 1. As shown in FIG. 2, the user IDs and user information are stored in advance in the user information storing unit. The user IDs are identifiers for identifying the users using user terminals 20 connected to the information providing apparatus 10. The user information includes information regarding the users to be respectively identified by the user IDs. The user information includes items, e.g., the name, age, sex, present address, previous address, hobby, etc. of each of the users.

In the example shown in FIG. 2, the user information storing unit stores user information including the user ID "0001", the user name "xxxx", the age "70s", the sex "Male", the present address "Present address 1", the previous address "Previous address 1" and the hobby "Humorous poem".

Also, the user information storing unit stores user information including the user ID "0002", the user name "yyyy", the age "80s", the sex "Female", the present address "Present address 2", the previous address "Previous address 2", and the hobby "Pictorial letter".

Although only the user information regarding users identified by the user IDs "0001" and "0002" is referred to above with reference to FIG. 2, the user information storing unit stores user information regarding all users using the user terminals 20 connected to the information providing apparatus 10 (i.e., all users who are given the user terminals 20).

Also, although the user information including the name, age, sex, present address, previous address and hobby of the user is explained above, it is an example of the user information. Thus, the user information may include another or other information. Furthermore, although the number of hobbies indicated in the user information explained with reference to FIG. 2 is one, the user information may include a plurality of hobbies.

Although a detailed explanation of data structures of the provision information storing section and the screen menu information storing unit will be omitted, it should be noted that the provision information storing unit stores provision information associated with items (e.g., present and previous addresses and hobby) included in the user information, and the screen menu information storing unit stores a common screen menu item and a personal screen menus item (information) associated with the items included in the user information.

To be more specific, the provision information stored in the provision information storing unit includes area information and administration information associated with addresses (present and previous addresses) included in the user information, and also information regarding a hobby (e.g., a humorous poem or a pictorial letter), etc. Furthermore, the personal screen menu information stored in the screen menu information storing unit includes personal screen menu information for providing area information and administration information associated with addresses (present and previous addresses) included in the user information, and personal screen menu information for providing information regarding a hobby (e.g., a humorous poem or a pictorial letter), etc.

FIG. 3 shows an example of a data structure of the group information storing unit 15 as shown in FIG. 1. The group information storing unit 15 stores information on a group or groups to which users belong. As shown in FIG. 3, the group information storing unit 15 stores user IDs and group IDs in association with each other. The user IDs, as described above, are identifiers for identifying users using user terminals 20 connected to the information providing apparatus 10. The group IDs are identifiers for identifying groups to which the users identified by the user IDs belong.

In the example shown in FIG. 3, in the group information storing unit 15, the user ID "0001" and the group ID "01" are stored in association with each other. It means that the user identified by the user ID "0001" belongs to the group identified by the group ID "01".

Also, in the group information storing unit 15, the user ID "0002" and the group ID "02" are stored in association with each other. It means that the user identified by the user ID "0002" belongs to the group identified by the group ID "02".

Although the explanation of FIG. 3 is given only with respect to the groups to which the users identified by the user IDs "0001" and "0002" belong, the group information storing unit 15 stores information on groups to which all the users using the user terminals 20 connected to the information providing apparatus 10 belong. It should be noted that each user may belong to a plurality of groups.

An operation of the information providing apparatus 10 provided in the information providing system according to the first embodiment will be explained. The information providing apparatus 10 executes a display image producing processing and a positing information delivering processing.

First of all, the procedure of the display image producing processing to be executed by the information providing apparatus 10 will be explained with reference to the flowchart of FIG. 4. The display image producing processing is processing for producing display screen information associated with a user, which is to be displayed by a user terminal 20 for use by the user.

The user using the user terminal 20, for example, operates the user terminal 20 to request the information providing apparatus 10 to produce display screen information. The operation on the user terminal 20 to request production of the display screen information includes an operation of touching (contacting) the screen of the user terminal (tablet device) 20. The user who requests production of the display screen information will hereinafter be referred as an object user, and the user terminal 20 to be used by the object user will hereinafter be as a target user terminal.

When the object user requests production of display screen information through the object user terminal 20 as described above, the request (hereinafter referred to as a display image production request) is transmitted from the object user terminal 20 to the information providing apparatus 10. The display image production request contains a user ID for identifying the object user using the object user terminal 20.

The transmitting-receiving unit 13 included in the information providing apparatus 10 receives the display image production request transmitted by the object user terminal 20 (step S1).

Next, the image producing unit 12 acquires user information stored in the user information storing unit included in the image production information storing unit 11 in association with the user ID included in the display image production request received by the transmitting-receiving unit 13 (step S2). The user information acquired by the image producing unit 12 includes present and previous addresses, a hobby, etc., as shown in FIG. 2.

The image producing unit 12 acquires provision information associated with the user information from the provision information storing unit included in the image production information storing unit 11 (step S3). In this case, the image producing unit 12 acquires as the provision information, area information and administration information associated with the present and previous addresses included in the user information and information regarding the hobby.

Also, the image producing unit 12 acquires screen menu information associated with the acquired provision information, from the screen menu information storing unit included in the image production information storing unit 11 (step S4). In this case, the image producing unit 12 acquires common screen menu information and personal screen menu information associated with the provision information (the administration information, area information, and information regarding the hobby).

The image producing unit 12 produces display screen information for displaying the acquired provision information with the object user terminal 20, based on the acquired provision information and the acquired screen menu information (step S5). The image producing unit 12 produces the display screen information by applying the acquired screen menu information to screen information (template) prepared in advance.

The transmitting-receiving unit 13 transmits the display screen information produced by the image producing section 12 to the object user terminal 20 (step S6).

The display screen information transmitted by the transmitting-receiving unit 13 is received by the transmitting-receiving unit 21 included in the object user terminal 20. The display screen information received by the transmitting-receiving unit 21 is displayed by the displaying unit 22. Thereby, a screen menu item, etc., for displaying the provision information are displayed on the screen of the user terminal 20.

In this case, by designating a screen menu item on the screen of the object user terminal 20, the object user can acquire (browse) provision information associated with the screen menu item. The information displayed on the screen of the object user terminal 20, which is to be changed by designating a screen menu item on the screen, may be acquired from the information providing apparatus 10 each time the above designating operation is performed.

Furthermore, in the case where the above display image production request is made after the provision information and the user information regarding the object user are changed by the information updating unit 16, the display screen information is produced based on the changed information. It is therefore possible to flexibly cope with changing of the provision information and the user information. Also, in the case where the provision information and the user information are changed, the display screen information may be produced in such a way to enable changing of the above information (or changed content) to be displayed by the user terminal 20.

The image displayed by the user terminal 20, in which the display screen information associated with the user and produced by the display image producing processing is indicated, will be explained in detail.

The following explanation is given with respect to the case where the information providing system according to the first embodiment is applied to, e.g., a city, a district, a town or a village, and information is provided to senior citizens living in the city, district, town or village.

Also, the following explanation is given with respect to the image displayed by the user terminal 20 when display screen information associated with first and second users is displayed.

First of all, the image displayed by the user terminal 20 when the display screen information associated with the first user is displayed will be explained. In the explanation, suppose the information providing system according to the first embodiment is applied to "A city"; the provision information storing unit included in the image production information storing unit 11 stores as provision information, area information regarding "A city", administration information regarding "A city", event information regarding an event to be held in "A city", etc.; the provision information storing unit also stores as another provision information, information regarding hobbies, i.e., "humorous poem", "seventeen-syllabled poem", "pictorial letter", "photography", "illustration", "blog", etc.; and the provision information storing unit further stores as further provision information, information regarding shopping for goods related to hobbies (hereinafter referred to as shopping information), i.e., "supermarket", "bookstore", "greengrocery", "travel agency", "record store", "liquor store", etc.

Also, suppose the user information storing unit stores as user information regarding the first user, e.g., the age "60s", the sex "female" and the present address "A city"; and the user information storing unit further stores as another user information regarding the first user, the hobbies "pictorial letter", "photography", "illustration", "cooking", "music", "travel", etc.

Figure 5:
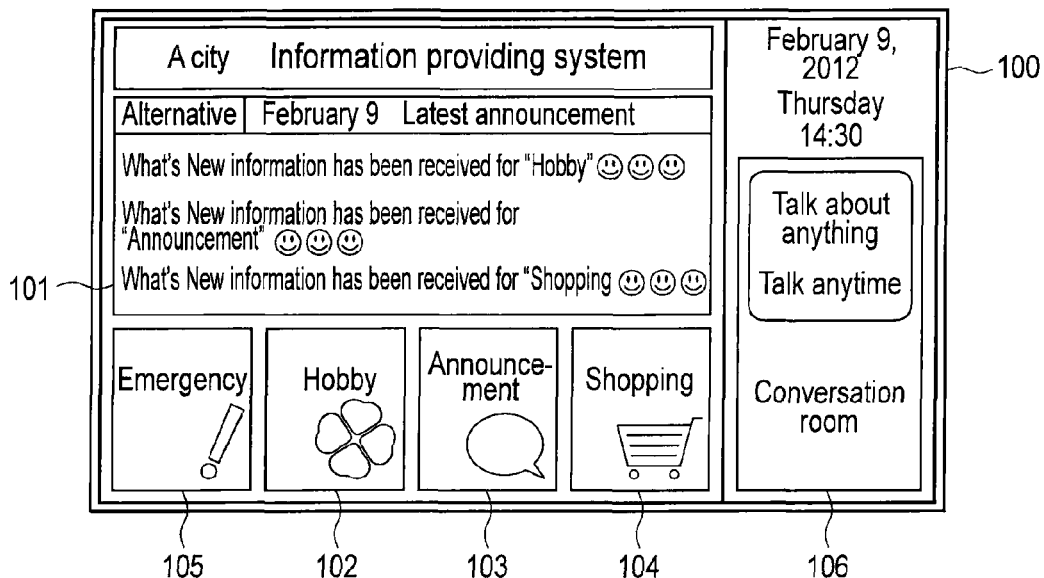
FIG. 5 is a view showing an example of an image displayed on a screen of a user terminal for use by a first user.

In this case, the user terminal 20 for use by the first user displays such an image 100 as shown in FIG. 5. The image 100 as shown in FIG. 5 is an example of an image displayed by the user terminal 20 in the case where display screen information associated with the first user, which is produced by executing the above display image producing processing, is indicated.

In the displayed image 100, a What's New field 101 and screen menu items 102-106 are displayed.

In the What's New field 101, content newly added when, e.g., provision information, is changed, etc. are displayed as What's New information.

The screen menu item 102 is a screen menu item for providing information regarding the hobby of the first user.

The screen menu item 103 is a screen menu item for providing event information, area information and administration information regarding "A city" where the first user lives.

The screen menu item 104 is a screen menu item for providing shopping information associated with the hobby of the first user.

The screen menu item 105 is a screen menu item for urgently notifying, for example, if an emergency arises for the first user, a predetermined security firm of the emergency. In this case, suppose the user terminal 20 has a function of urgently notifying the security firm of an emergency.

The screen menu item 106 is a screen menu item for communicating with an operator of a conversation room (call center) provided in advance. In this case, suppose the user terminal 20 has a function of communicating with the operator of the call center.

It should be noted that the screen menu items 102-104 are personal screen menu items associated with the first user, and the screen menu items 105 and 106 are common screen menu items to be displayed in common for all the users.

Images to be displayed when the screen menu items 102-104 indicated in the displayed image as shown in FIG. 5 are designated (touched) will be explained.

Figure 6:
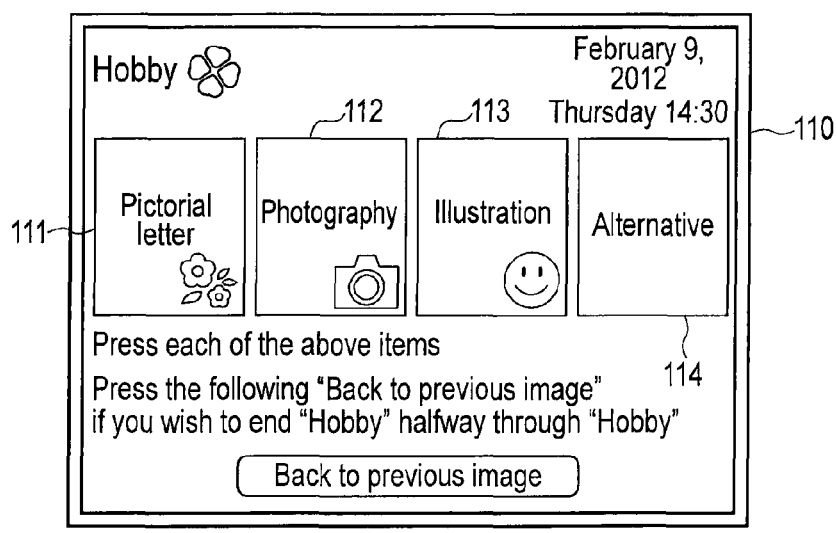
FIG. 6 is a view showing an example of an image which is displayed when a screen menu item 102 is designated in an image 100 displayed on the screen of the user terminal 20.

FIG. 6 shows an example of an image to be displayed when the screen menu item 102 is designated in the displayed image 100.

In a displayed image 110 as shown in FIG. 6, a "Pictorial letter" button 111, a "Photography" button 112, an "Illustration" button 113, and an "Alternative" button 114 are provided.

The "Pictorial letter" button 111, the "Photography" button 112 and the "Illustration" button 113 are buttons for providing information (provision information) on the hobbies "pictorial letter", "photography" and "illustration" included in the user information regarding the first user. When the first user designates the "Pictorial letter" button 111 in the display image 110, information regarding "pictorial letter" is displayed by the user terminal 20. Similarly, when the first user designates the "Photography" button 112 in the displayed image 110, information regarding "photography" is displayed by the user terminal 20. Also, when the first user designates the "Illustration" button 113 in the displayed image 110, information regarding "illustration" is displayed by the user terminal 20.

The information regarding "pictorial letter", "photography" and "illustration" includes, e.g., information posted from another user with respect to "pictorial letter", "photography" and "illustration".

Furthermore, when designating the "Alternative" button 114 in the displayed image 110, the first user can view information regarding a hobby or hobbies other than "pictorial letter", "photography" and "illustration" (e.g., "humorous poem" or "seventeen-syllabled poem").

Figure 7:
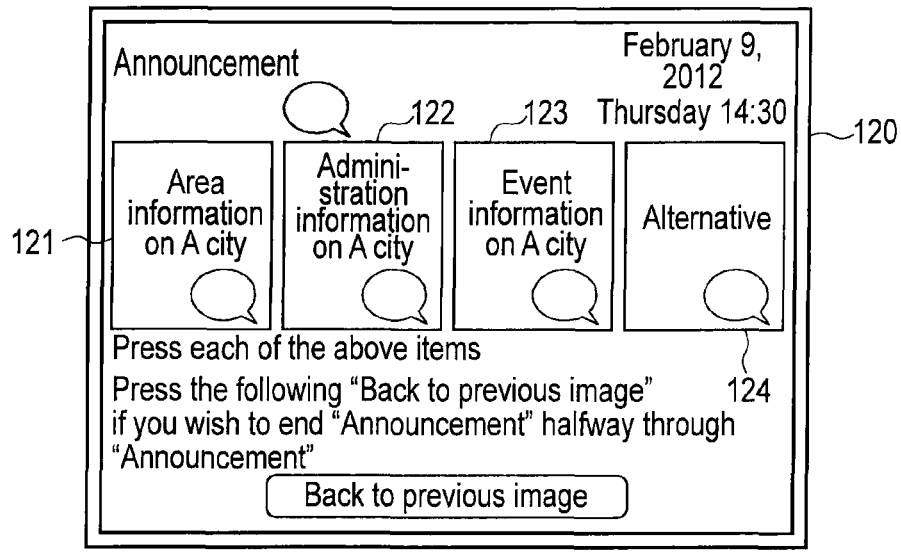
FIG. 7 is a view showing an example of an image which is displayed when a screen menu item 103 is designated in the image 100 displayed on the screen of the user terminal 20.

FIG. 7 shows an example of an image displayed when the screen menu item 103 is designated in the image 100 displayed on the screen of the user terminal 20.

In an image 120 displayed as shown in FIG. 7, an "A city area information" button 121, an "A city administration information" button 122, an "A city event information" button 123 and an "Alternative" button 124 are provided.

The "A city area information" button 121, the "A city administration information" button 122 and the "A city event information" button 123 are buttons for providing information (provision information) regarding the present address included in the user information regarding the first user. When the first user designates the "A city area information" button 121 in the displayed image 120, area information regarding "A city" is displayed by the user terminal 20. Similarly, when the first user designates the "A city administration information" button 122 in the displayed image 120, administration information regarding "A city" is displayed by the user terminal 20. Also, when the first user designates the "A city event information" button 123 in the displayed image 120, event information regarding "A city" is displayed by the user terminal 20.

When the first user designates the "Alternative" button 124 in the displayed image 120, event information, administration information and area information regarding an area or areas other than the area "A city", e.g., a certain city, district, town and/or village (city, district, town and/or village located in the vicinity of "A city") can be viewed.

Figure 8:
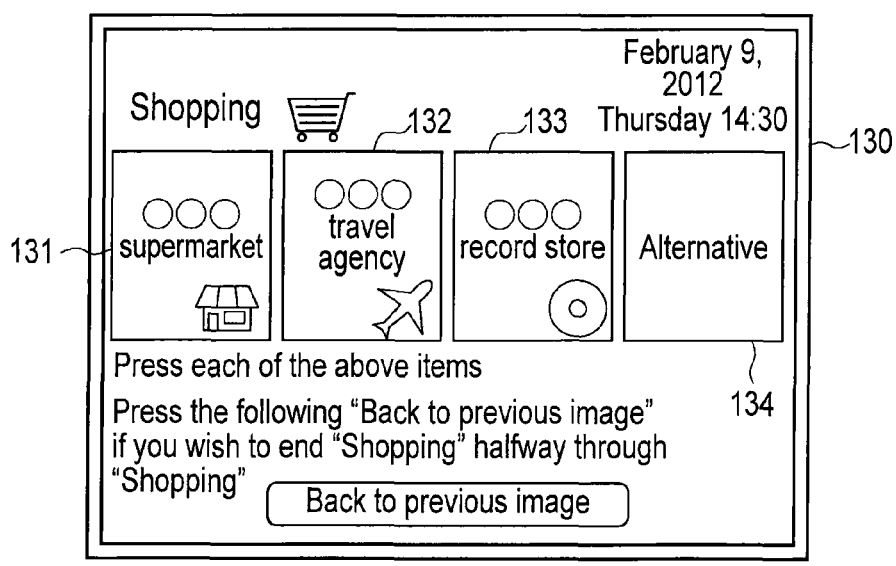
FIG. 8 is a view showing an example of an image which is displayed when a screen menu item 104 is designated in the image 100 displayed on the screen of the user terminal 20.

FIG. 8 shows an example of an image displayed when the screen menu item 104 is designated in the image 100 displayed on the screen of the user terminal 20.

In the displayed image 130 as shown in FIG. 8, a ". . . supermarket" button 131, a ". . . travel agency" button 132, a ". . . record store" button 133 and an "Alternative" button 134 are provided.

The ". . . supermarket" button 131, the ". . . travel agency" button 132 and the ". . . record store" button 133 are buttons for providing shopping information (provision information) on goods associated with the hobbies "cooking", "music" and "travel" included in the user information regarding the first user. When the first user designates the ". . . supermarket" button 131 in the displayed image 130, information on foods, etc., on sale in the ". . . supermarket" is displayed by the user terminal 20. Furthermore, when the first user designates the ". . . travel agency" button 132 in the displayed image 130, information on goods for travel, etc. which are on sale in the ". . . travel agency", is displayed by the user terminal 20. Similarly, when the first user designates the ". . . record store" button 133 in the displayed image 130, information on records, etc., on sale in the ". . . record store" is displayed by the user terminal 20.

Although it is explained above that information regarding goods, etc., on sale in the ". . . supermarket", the ". . . travel agency" and the ". . . record store" is displayed by the user terminal 20, for example, information for placing an order for home-delivery of the goods may be displayed.

When the first user designates the "Alternative" button 134 in the displayed image 130, information regarding stores other than the ". . . supermarket", the ". . . travel agency" and the ". . . record store" can be viewed.

In such a manner, display screen information associated with the first user is displayed by the user terminal 20 of the first user. Thus, the first user can obtain more useful information.

Next, the following explanation is given with respect to an image displayed by the user terminal 20 of the second user when display screen information associated with the second user is displayed. It is also given on the supposition that the information providing system according to the first embodiment is applied to, e.g., "B district"; the provision information storing unit included in the image production information storing unit 11 stores as provision information, area information regarding "B district", administration information regarding "B district", event information on an event or events to be held in the "B district", etc.; the provision information storing unit stores as another provision information, information regarding hobbies, i.e., "humorous poem", "seventeen-syllabled poem", "pictorial letter", "photography", "illustration", "blog", etc.; and the provision information storing unit stores as further provision information, shopping information "supermarket", "bookstore", "greengrocery", "travel agency", "record store", "liquor store", etc.

Also, suppose the user information storing unit stores as user information associated with the second user, e.g., the age "70s", the sex "male" and the present address "B district"; and the user information unit stores as another user information associated with the second user, the hobbies "seventeen-syllabled poem", "humorous poem", "photography", "radio", "liquor", "reading", etc.

Figure 9:
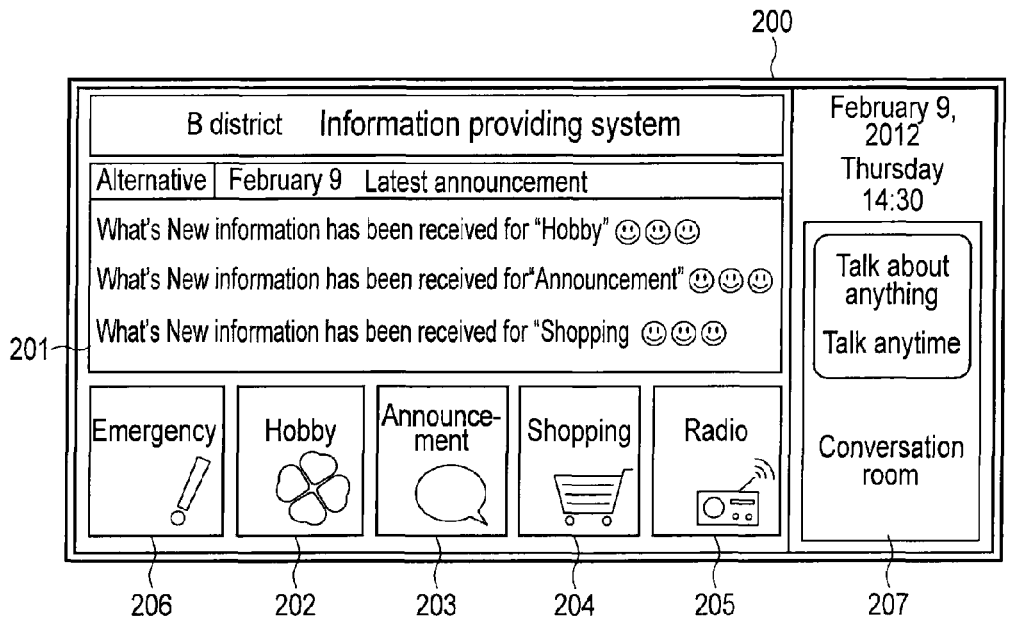
FIG. 9 is a view showing an example of an image displayed on a screen of a user terminal 20 for use by a second user.

In the above case, the user terminal 20 for use by the second user displays an image 200 as shown in FIG. 9. The image 200 as shown in FIG. 9 is an example of an image which is displayed by the user terminal 20 in the case where display screen information associated with the second user, which is produced by executing the above display image producing processing, is indicated.

In the image 200, a What's New field 201 and screen menu items 202-207 are displayed. The What's New field 201 is the same as the What's New field 101 as shown in FIG. 5, and its detailed explanation will thus be omitted. Also, the screen menu items 202-204, 206 and 207 are the same as the screen menu items 102-106 as shown in FIG. 5, and their detailed explanations will thus be omitted.

The screen menu item 205 is a screen menu item for listening to the radio. In this case, suppose the user terminal 20 has a function of a receiver to receive radio broadcasting. The screen menu item 205 is associated with the hobby "radio" included in the user information regarding the second user, and is a personal screen menu item associated with the second user. When the second user designates the screen menu item 205, radio broadcasting is output from a speaker of the user terminal 20, and the second user can thus listen to the radio broadcasting.

An image which is displayed when each of the screen menu items 202-204 indicated in the image 200 as shown in FIG. 9 is designated (touched) will be specifically explained.

Figure 10:
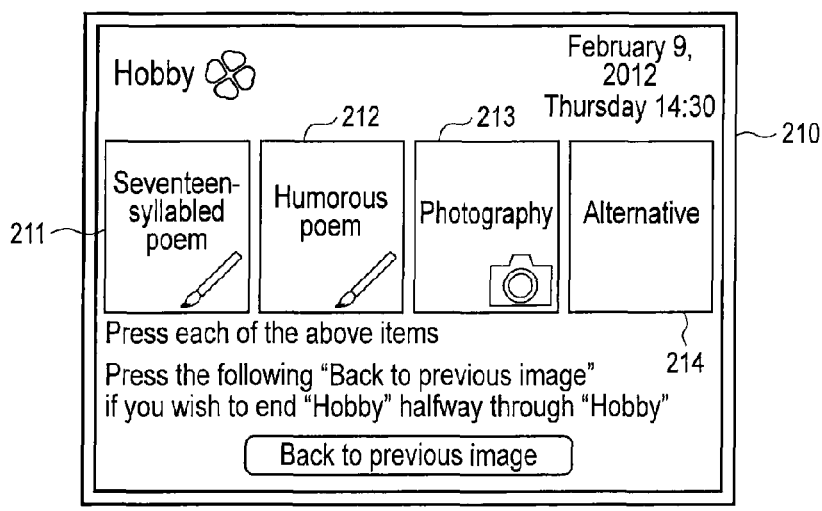
FIG. 10 is a view showing an example of an image which is displayed when a screen menu item 202 is designated in the image 200 displayed on the screen of the user terminal 20.

FIG. 10 shows an example of an image which is displayed when the screen menu item 202 is designated in the image 200 displayed on the screen of the user terminal 20.

In the image 210 as shown in FIG. 10, a "Seventeen-syllabled poem" button 211, a "Humorous poem" button 212, a "Photography" button 213 and an "Alternative" button 214 are provided.

The "Seventeen-syllabled poem" button 211, the "Humorous poem" button 212 and the "Photography" button 213 are buttons for providing information (provision information) regarding the hobbies "seventeen-syllabled poem", "humorous poem" and "photography" included in the user information associated with the second user. When the second user designates the "Seventeen-syllabled poem" button 211 in the displayed image 210, information regarding "seventeen-syllabled poem" is displayed by the user terminal 20. Similarly, when the second user designates the "Humorous poem" button 212 in the displayed image 210, information regarding "humorous poem" is displayed by the user terminal 20. Also, when the second user designates the "Photography" button 213 in the displayed image 210, information regarding "photography" is displayed by the user terminal 20.

The above information regarding "seventeen-syllabled poem", "humorous poem" and "photography" includes posting information posted from another user, etc. regarding "seventeen-syllabled poem", "humorous poem" and "photography".

Furthermore, when designating the "Alternative" button 214 in the displayed image 210, the second user can view information regarding hobbies other than the hobbies "seventeen-syllabled poem", "humorous poem" and "photography".

Figure 11:
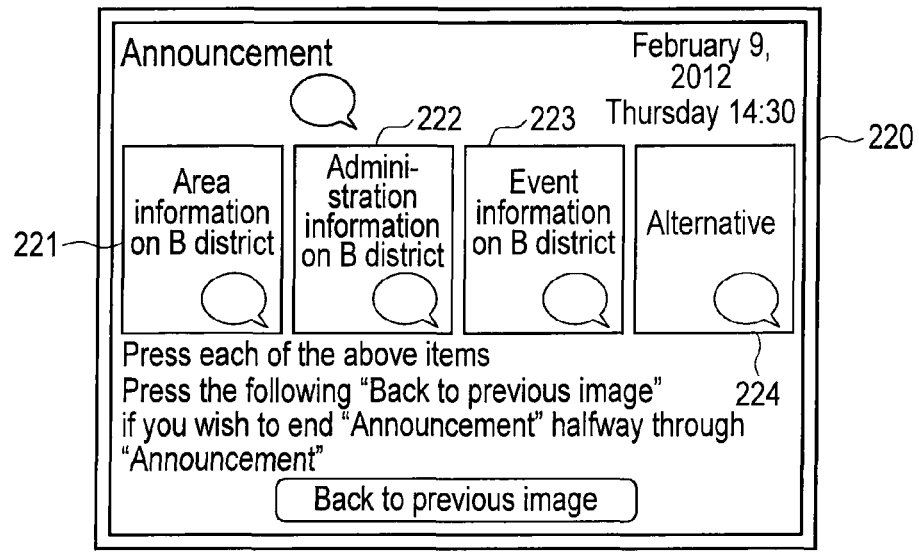
FIG. 11 is a view showing an example of an image which is displayed when a screen menu item 203 is designated in the image 200 displayed on the screen of the user terminal 20.

FIG. 11 shows an example of an image which is displayed when the screen menu item 203 is designated in the image 200 displayed on the screen of the user terminal 20.

In a displayed image 220 as shown in FIG. 11, a "B district area information" button 221, a "B district administration information" button 222, a "B district event information" button 223 and an "Alternative" button 224 are provided.

The "B district area information" button 221, the "B district administration information" button 222 and the "B district event information" button 223 are buttons for providing information (provision information) regarding the present address included in the user information associated with the second user. When the second user designates the "B district area information" button 221 in the displayed image 220, area information regarding "B district" is displayed by the user terminal 20. Similarly, when the second user designates the "B district administration information" button 222 in the displayed image 220, administration information regarding "B district" is displayed by the user terminal 20. Also, when the second user designates the "B district event information" button 223 in the displayed image 220, event information regarding "B district" is displayed by the user terminal 20.

When designating the "Alternative" button 224 in the displayed image 220, the second user can view event information, administration information and area information regarding an area or areas other than the area "B district", e.g., a certain city, district, town and/or village (city, district, town and/or village located in the vicinity of "B district").

Figure 12:
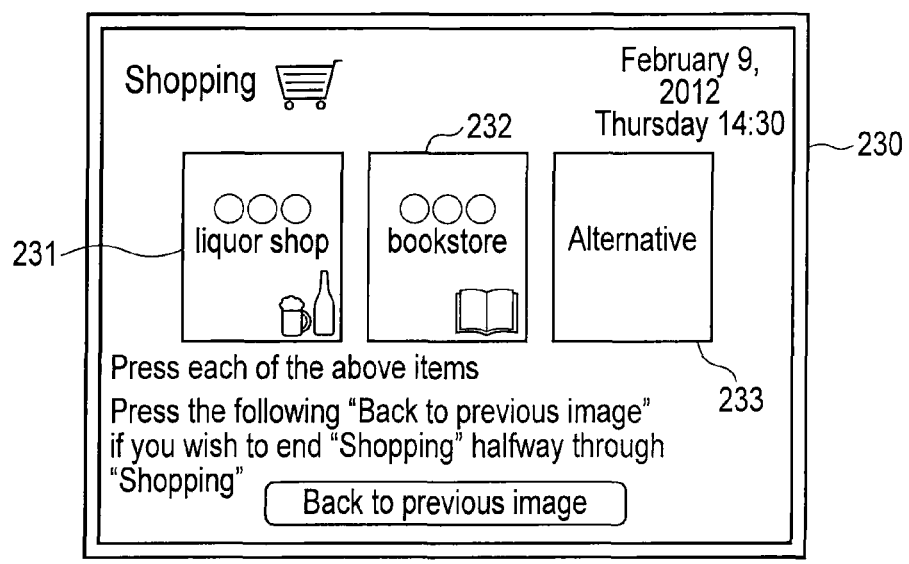
FIG. 12 is a view showing an example of an image which is displayed when a screen menu item 204 is designated in the image 200 displayed on the screen of the user terminal 20.

FIG. 12 shows an example of an image which is displayed when the screen menu item 204 is designated in the image 200 displayed on the screen of the user terminal 20.

In a displayed image 230 as shown in FIG. 12, a ". . . liquor store" button 231, a ". . . bookstore" button 232 and an "Alternative" button 233 are provided.

The ". . . liquor store" button 231 and the ". . . bookstore" button 232 are buttons for providing shopping information (provision information) associated with the hobbies "liquor" and "reading" included in the user information regarding the second user. When the second user designates the ". . . liquor store" button 231 in the displayed image 230, information regarding liquor, etc., on sale in the ". . . liquor store" is displayed by the user terminal 20. Also, when the second user designates the ". . . bookstore" button 232 in the displayed image 230, information regarding books, etc., on sale in the ". . . bookstore" is displayed by the user terminal 20.

Although it is explained above that information on goods, etc., on sale in the ". . . liquor store" and ". . . bookstore" is displayed, information for placing an order for home-delivery of the goods may be displayed as described above.

When designating an "Alternative" button 234 in the displayed image 230, the second user can view information regarding, e.g., a shop other than ". . . liquor shop" and ". . . bookstore".

In such a manner, since display screen information associated with the second user is displayed by the user terminal 20 for use by the second user, the second user can obtain more useful information.

It is explained above that when designating the screen menu item 204 in the displayed image 200 as shown in FIG. 9, the image 203 as shown in FIG. 12 is displayed; however, with respect to, e.g., a supermarket which is utilized in common by users, even if it is not registered as user information, it is also possible to produce an image which can provide such information (for example, an image in which a ". . . supermarket" button is provided).

Figure 13:
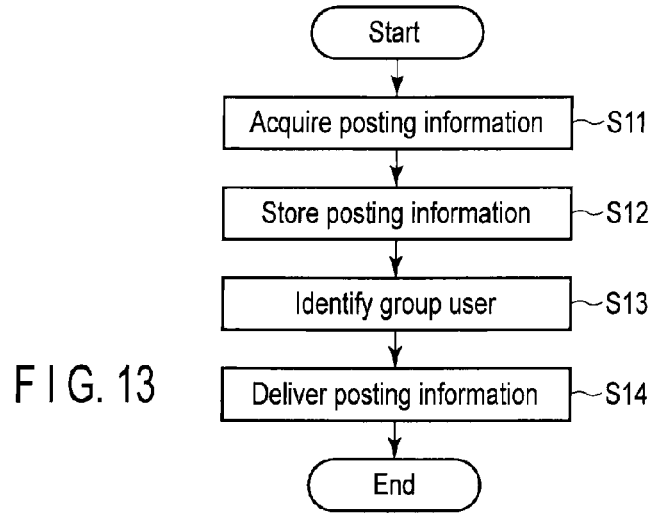
FIG. 13 is a flowchart of a procedure of a posting information delivering processing to be executed by the information providing apparatus 10 provided in the information providing system according to the first embodiment.

Next, a procedure of the posting information delivering processing to be executed by the information providing apparatus 10 will be explained with reference to a flowchart of FIG. 13. The posting information delivering processing is processing for sending posting information posted from a user to a group to which the user belongs, to another user belonging to the group.

It should be noted that as the above group, the following groups can be considered: a group to which users regarding which user information is the same as each other, e.g., a group to which users whose present addresses are the same as each other, belong; a group to which users whose previous addresses are the same as each other belong; and a group to which users having the same hobby belong, etc.

First of all, the group managing unit 14 acquires posting information (step S11). The posting information acquired by the group managing unit 14 includes group ID for identifying a group to which the posting information is posted. It should be noted that for example, the posting information may be acquired from, e.g., the user terminal 20 for use by the user or the control center or the like connected to the information providing apparatus 10.

Next, the group managing unit 14 stores the posting information in, e.g., the provision information storing unit included in the image production information storing unit 11 (step S12). Thereby, for example, in the display image producing processing, the posting information can be used as provision information.

The group managing unit 14 identifies a user or users (group user or users) belonging to the group to which the acquired posting information is posted, by referring to the group information storing unit 15 (step S13). In this case, the group managing unit 14 identifies as the group user or users, a user or users identified by user ID or IDs stored in the group information storing unit 15 in association with group ID included in the acquired posting information.

Next, the group managing unit 14 delivers the posting information to terminals 20 for use by the identified group users (step S14). Thereby, the group users can view the delivered posting information through the user terminals 20.

The posting information delivering processing will be specifically explained. For example, suppose users regarding which user information indicates that their hobbies are "humorous poem" belong to a group (hereinafter referred to a "humorous poem" group). In this case, posting information posted by the user belonging to the "humorous poem" group (e.g., a humorous poem made by a user belonging to the "humorous poem" group) is sent to another user or other users belonging to the "humorous poem". Thereby, the posting information can be shared with the users belonging to the "humorous poem" group.

Furthermore, suppose users regarding which user information indicates that their previous addresses are the same as each other (or addresses of neighbors) belong to a group (hereinafter referred to a "previous address" group). In this case, posting information posted from a user belonging to the "previous address" group (for example, a message or the like from the user to another user who had the "previous address") is sent to another user belonging to the "previous address" group. This feature enables users who leaved an area indicated by previous addresses for various reasons to promote interaction between the users. Although it is explained above that the posting information is delivered to all the users belonging to the "previous address" group, it is also possible to provide a structure for searching for a specific user (e.g., an acquaintance who had the previous address) of the users on which user information indicates that their previous addresses are the same as each other, and then sending the posting information to the specific user.

It should be noted that in the case where posting information is posted, information to the effect that new posting information is present may be indicated in the What's new field 101 as shown in FIG. 5 or the What's New field 201 as shown in FIG. 9.

As described above, in the first embodiment, in accordance with a request from a user, user information stored in the user information storing unit in association with user ID for indentifying the user is acquired, provision information associated with the acquired user information is acquired from the provision information storing unit, display screen information for displaying the acquired provision information is produced, and the produced display screen information is transmitted to a user terminal for use by the user in order for the display screen information to be displayed by the user terminal. This structure enables desired information for the user to be provided to the user.

Also, in the first embodiment, based on user information stored in the user information storing unit, a group to which users identified by user IDs stored in the user information storing unit in association with the user information belong is organized; posting information posted from a user belonging to the group thereto is acquired; and the acquired posting information is sent to a user terminal for use by another user belonging to the group. This structural feature enables posting information to be shared with users belonging to a group automatically organized based on the user information, and can provide a new community (setting for self-expression) of users, e.g., senior citizens, who have the same hobby or the like, and further urge them to join the community.

Furthermore, in the first embodiment, the user information stored in the user information storing unit and the provision information stored in the provision information storing unit can be changed in accordance with the operation by a manager. Thus, changing of the user information and the provision information can be flexibly handled. To be more specific, in the case where the information providing system according to the first embodiment is introduced into a city, a district, a town, a village or the like, event information, area information and administration information regarding the city, district, town, village or the like can be updated as occasion demands. It is therefore possible to flexibly handle, for example, a change in an effort to give administration or a request made by a user, etc., and provide the user with more useful information.

With respect to the first embodiment, although it is explained above that the information providing system is utilized by a city, a district, a town, a village or the like, and administration information and area information and information regarding the hobby of a user, etc., associated with the user such as a senior citizen are provided to the user, it is also possible to provide such a structure as to provide a user or user joining, for example, a private preparatory school with, e.g., information regarding a field which a user or users joining the private preparatory school take interest, the information being utilized by the private preparatory school.

That is, the information providing system according to the first embodiment can be applied to the case where various kinds of information is provided to multiple users using user terminals 20. To be more specific, the information providing system according to the first embodiment can be used by, e.g., a senior citizen, a user whose enjoys a service of care, a victim, a person which can hardly do the shopping, a user who takes a graded class curriculum in a school, a private preparatory school or the like, and a user who enjoys another service.

Furthermore, according to the first embodiment, information on a screen menu item designated by the user in an image displayed on the screen of the above user terminal 20 (i.e., information indicating which of the screen menu items is designated) may be stored in the information providing apparatus 10, and in the display image producing processing, a screen menu item used by users with a low frequency may be changed to another screen menu item (that is, in place of provision information viewed with a low frequency, another provision information may be displayed).

Second Embodiment

Figure 14:
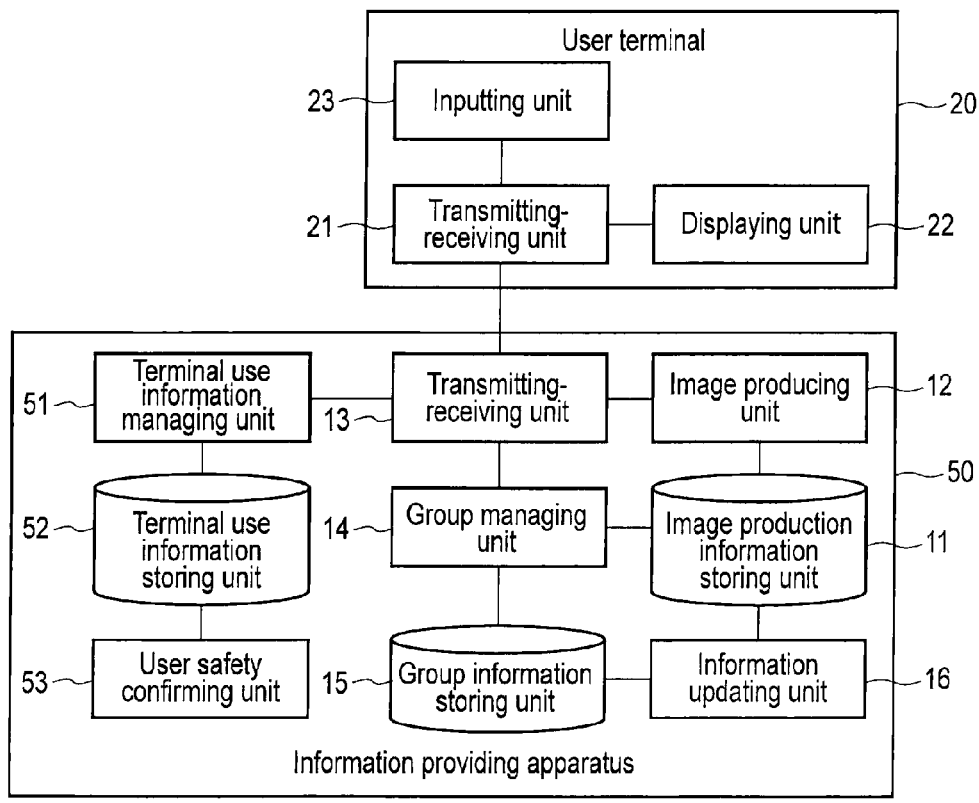
FIG. 14 is a block diagram primarily showing a function structure of an information providing system according to a second embodiment of the present invention.

A second embodiment of the present invention will be explained. FIG. 14 is a block diagram primarily showing a function structure of an information providing system according to the second embodiment. It should be noted that the same elements as described above with reference to FIG. 1 will be denoted by the same reference numerals as in FIG. 1, and their detailed explanations will be omitted. In the following explanation, elements differing from the elements as shown in FIG. 1 will be explained primarily.

In the second embodiment, it is confirmed whether a user is safe or not based on a history of use of a user terminal 20 by the user. In this regard, the second embodiment is different from the first embodiment.

As shown in FIG. 14, the information providing system according to the second embodiment comprises an information providing apparatus 50. The information providing apparatus 50 comprises a terminal use information managing unit 51, a terminal use information storing unit 52 and a user safety confirming unit 53.

The terminal use information managing unit 51 stores, in the case where a user uses (operates) a user terminal 20, terminal use information indicating that the user terminal 20 was used, in the terminal use information storing unit 52. The terminal use information to be stored in the terminal use information storing unit 52 includes user ID for identifying the user who used the user terminal 20 and use time information indicating a date and time when the user terminal 20 was used. It should be noted that it is possible to detect that the user terminal 20 was used, by reception of a display image production request or the like by the transmitting-receiving unit 13 described with respect to the first embodiment.

The user safety confirming unit 53 executes processing (hereinafter referred to as safety confirming processing) for confirming whether the user using the user terminal 20 is safe or not based on the terminal use information stored in the terminal use information storing unit 52. It should be noted that the safety confirming processing will be described in detail later.

Figures 15, 16:
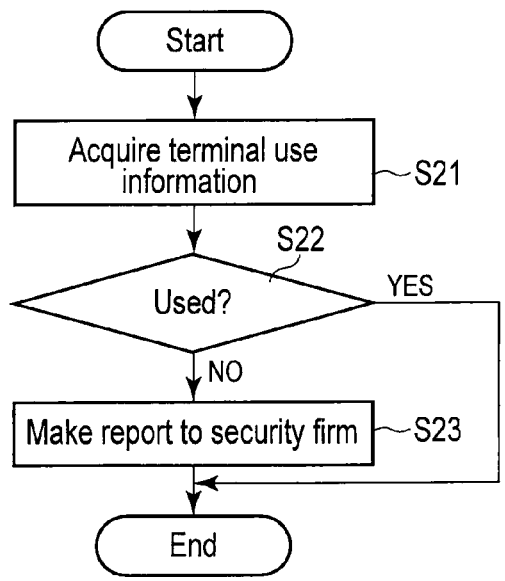
FIG. 15 is a view showing an example of a data structure of a terminal use information storing unit 52 as shown in FIG. 14.
FIG. 16 is a flowchart of a procedure of a safety confirming processing to be executed by a user safety confirming unit 53.

FIG. 15 shows an example of a data structure of the terminal use information storing unit 52 as shown in FIG. 14. As shown in FIG. 15, the terminal use information storing unit 52 stores terminal use information including user ID and use time information. The user ID is an identifier for identifying a user using a user terminal connected to the information providing apparatus 10. The use time information indicates a date and time at which the user terminal 20 was used by the user identified by the user ID thereof.

In an example shown in FIG. 15, the terminal use information storing unit 52 stores terminal use information including the user ID "0001" and the use time information "2012/01/15 10:15". This indicates that a user identified by the user ID "0001" used a user terminal 20 at 10:15 on Jan. 15, 2012.

Also, the terminal use information storing unit 52 stores terminal use information including the user ID "0001" and the use time information "2012/01/16 18:30". This indicates that a user identified by the user ID "0002" used a user terminal 20 at 18:30 on Jan. 16, 2012.

With respect to the terminal use information, the above explanation is given only regarding the terminal use information regarding the user identified by the user ID "0001". However, the terminal use information storing unit 52 stores terminal use information regarding all users using user terminals 20 connected to the information providing apparatus 10.

A procedure of the safety confirming processing to be executed by the user safety confirming unit 53 included in the information providing apparatus 50 of the information providing system according to the second embodiment will be explained with reference to the flowchart of FIG. 16.

The safety confirming processing is executed with respect to each of the users using the user terminals 20 connected to the information providing apparatus 50. It should be noted that a user whose safety is to be confirmed in the safety confirming processing will hereinafter be referred to as an object user.

First, the user safety confirming unit 53 acquires terminal use information including user ID for identifying an object user, from the terminal use information storing unit 52 (step S21).

Next, the user safety confirming unit 53 determines whether a user terminal 20 was used by the object user in a predetermined time period or not, based on use time information included in the acquired terminal use information (step S22). If the use time information included in the acquired terminal use information includes use time information indicating a date and time which falls within the predetermined time period, the user safety confirming unit 53 determines that the user terminal 20 was used, and if the above use time information does not include use time information indicating a date and time falling within the predetermined time period, the ser safety confirming unit 53 determines that the above user terminal 20 was not used.

If determining that the user terminal 20 was not used (No in step S22), the user safety confirming unit 53 reports to, e.g., a security firm, that the user terminal 20 was not used (step S23). Thereby, e.g., a watchman working at the security firm can visit the object user and confirm whether the object user is safe or not.

On the other hand, if it is determined that the user terminal 20 was used (Yes in step S22), a process of step S23 is not carried out, and the safety confirming processing ends.

It is explained above that if it is determined in step S22 that the user terminal 20 was not used, it is reported to the security firm. However, it is also possible to set such a structure as to report it to, e.g., an operator or the like at the above call center, and then report, if the operator makes a call to the object user and the object user does not answer the call, it to the security firm.

As described above, in the second embodiment, in the case where a user terminal 20 was used by a user, terminal user information which indicates that the user terminal 20 was used and which includes use time information indicating a date and time at which the user terminal 20 was used is stored in the terminal use information storing unit 52; it is determined whether the user terminal 20 was used in a predetermined time period or not based on the use time information included in the terminal use information stored in the terminal use information storing unit 52; and if it is determined that the user terminal was not used, it is reported that the user terminal 20 was not used. By virtue of this structure, for example, if an abnormality is caused in a user, and thus the user does not use a user terminal 20, it can be found early.

It is explained above that in the second embodiment, a report is made to a security firm or the like based on whether the user terminal 20 was used or not. However, it may be set as a structure that detection information indicating a state of the user, which is detected by a given type of sensor held by the user, is received, various types of sensors being applicable to the above sensor; it is determined based on the detection information whether an abnormality is caused in the user or not; and then if it is determined that an abnormality is caused in the user, it is reported to the security firm or the like.

Furthermore, it may be set as a structure that information on whether the user terminal 20 was used or not and the detection information detected by any of various kinds of sensors are both applied. In this case, it may be set that in the case where it is determined based on the terminal use information that the user terminal 20 was not used, and it is determined based on the detection information detected by any of various kinds of sensors that an abnormality is caused in the user, it is reported to the security firm. Also, it may be set that in the case where it is determined based on the terminal use information that the user terminal 20 was not used, or it is determined based on the detection information detected by any of various kinds of sensors that an abnormality is caused in the user, it is reported to the security firm.

Also, it may be set as a structure that information other than the terminal use information or the detection information, e.g., a history of calls made by the user to the call center or information on a cell phone or the like held by the user is used.

Furthermore, it can be set as a structure to store data on a history of reports made to the security firm in the information providing apparatus 50 according to the second embodiment, and to shorten a predetermined time period set for step S22 shown in FIG. 16 for a user having a large number of the history of reports.

It should be noted that the methods explained above with respect to the first and second embodiments can be distributed as programs to be executable by a computer, which are stored in a storage medium such as a magnetic disk (a floppy (registered trademark) disk, a hard disk or the like), an optical disk (a CD-ROM, a DVD or the like), magneto-optical disk (MO), a semiconductor memory or the like.

Also, the above storage medium may have any memory formation as long as it can store a program and is also computer-readable.

Further, an operating system (OS) which is run on a computer based on a command from a program installed from a storage medium on the computer, middleware (MW) such as a database management software or network software may execute part of each of processes for achieving each of the embodiments.

Furthermore, the storage medium in the present invention is not limited to a medium provided independent of the computer; that is, as the storage medium, a storage medium is applicable which stores or temporally stores a program by downloading it thereinto through a LAN, the Internet or the like.

Also, the number of storage mediums used in the present invention is not limited to one; that is, the present invention covers the case where the processes of each of the embodiments are executed with a plurality of mediums, and the medium structure may be set in any manner.

It should be noted that with respect to the computer used in the present invention, a single apparatus such as a personal computer which executes each of the processes in each of the embodiments may be applied, or a plurality of apparatuses which are connected to a network and execute the above processes may be applied.

Also, the computer in the present invention is not limited to the personal computer; that is, as the computer in the present invention, e.g., a microcomputer and an arithmetic processing apparatus included in an information processing apparatus can be applied, and the computer in the present invention covers a machine or an apparatus which can fulfill the functions of the present invention with a program or programs.

The present invention is not limited to the above embodiments only, and can be embodied by modifying a structural element or elements without departing from its subject matter when it is put to practical use. Also, various inventions can be made by appropriately combining a plurality of structural elements disclosed with respect to the above embodiments. For example, some of all the structural elements disclosed with respect to the embodiments may be deleted. Also, structural elements used in the embodiment may be combined as appropriate.

What is claimed is:

1. An information providing apparatus to be connected with a plurality of user terminals for use by a plurality of specific users to communicate with the plurality of user terminals, comprising:
a user information storing unit configured to store user information items regarding the plurality of specific users in association with user identification information items for identifying the plurality of specific users, respectively;
a provision information storing unit configured to store various kinds of provision information items to be provided to the plurality of user terminals;
a first acquiring unit configured to acquire, in response to a request from an arbitrary one of the plurality of specific users, a user information item stored in the user information storing unit in association with a user identification information item for identifying the arbitrary user;
a second acquiring unit configured to acquire a provision information item associated with the acquired user information item, from the provision information storing unit;
a producing unit configured to produce screen information for displaying the provision information item acquired by the second acquiring unit, the screen information including a common menu item to be displayed in common for the plurality of specific users and a personal screen menu item for displaying the provision information item acquired by the second acquiring unit;
a transmitting unit configured to transmit the produced screen information to a user terminal for use by the arbitrary user to cause the screen information to be displayed by the user terminal;
a terminal use information storing unit configured to store terminal use information which indicates that the user terminal for use by the arbitrary user was used and which includes use time information indicating a date and time at which the user terminal was used, in a case where the user terminal was used by the arbitrary user;
a determining unit configured to determine whether or not the user terminal for use by the arbitrary user was used in a predetermined time period, based on the use time information included in the terminal use information stored in the terminal use information storing unit;
a reporting unit configured to make, when it is determined that the user terminal for use by the arbitrary user was not used, a report indicating that the user terminal was not used; and
a time changing unit configured to change the predetermined time period in accordance with a number of reports each of which is made when it is determined that the user terminal for use by the arbitrary user was not used.

2. The information providing apparatus of claim 1, further comprising:
a group organizing unit configured to organize, based on a user information item stored in the user information storing unit, a group to which a user identified by a user identification information item stored in association with the user information item in the user information storing unit belongs;
a third acquiring unit configured to acquire posting information posted to the organized group by the user belonging to the group; and
a delivering unit configured to deliver the posting information acquired by the third acquiring unit to a user terminal for use by the user belonging to the organized group.

3. The information providing apparatus of claim 1, further comprising:
a changing unit configured to change, in accordance with an operation by a manager, a user information item stored in the user information storing unit and a provision information item stored in the provision information storing section.

4. An information providing system comprising a plurality of user terminals for use by a plurality of specific users and an information providing apparatus to be connected to the plurality of user terminals to communicate therewith,
wherein
the information providing apparatus comprises:
a user information storing unit configured to store user information items regarding the plurality of specific users in association with user identification information items for identifying the plurality of specific users, respectively;
a provision information storing unit configured to store various kinds of provision information items to be provided to the plurality of user terminals;
a first acquiring unit configured to acquire, in response to a request from an arbitrary one of the plurality of specific users, a user information item stored in the user information storing unit in association with a user identification information item for identifying the arbitrary user;
a second acquiring unit configured to acquire a provision information item associated with the acquired user information item, from the provision information storing unit;
a producing unit configured to produce screen information including a common screen menu to be displayed in common for the plurality of specific users and a personal screen menu item for displaying the provision information item acquired by the second acquiring unit;
a transmitting unit configured transmit the produced screen information to a user terminal for use by the arbitrary user;
a terminal use information storing unit configured to store terminal use information which indicates that the user terminal for use by the arbitrary user was used and which includes use time information indicating a date and time at which the user terminal was used, in a case where the user terminal was used by the arbitrary user;
a determining unit configured to determine whether or not the user terminal for use by the arbitrary user was used in a predetermined time period, based on the use time information included in the terminal use information stored in the terminal use information storing unit;
a reporting unit configured to make, when it is determined that the user terminal for use by the arbitrary user was not used, a report indicating that the user terminal was not used; and
a time changing unit configured to change the predetermined time period in accordance with a number of reports each of which is made when it is determined that the user terminal for use by the arbitrary user was not used, and
the user terminal comprises:
a receiving unit configured to receive the transmitted screen information; and
a displaying unit configured to display the received screen information.

5. An information providing method executed by an information providing apparatus which is to be connected to a plurality of user terminals for use by a plurality of specific users to communicate therewith, and which comprises: a user information storing unit configured to store user information items regarding the plurality of specific users in association with user identification information items for identifying the plurality of specific users, respectively; a provision information storing unit configured to store various kinds of provision information items to be provided to the plurality of user terminals; and a terminal use information storing unit configured to store, in a case where each of the plurality of user terminals was used by a respective one of the plurality of specific users, terminal use information which indicates that said each user terminal was used and which includes use time information indicating a date and time at which said each user terminal was used, comprising:

acquiring, in response to a request from an arbitrary one of the plurality of specific users, a user information stored in the user information storing unit in association with a user identification information item for identifying the arbitrary user;

acquiring a provision information item associated with the acquired user information item, from the provision information storing unit;

producing screen information including a common screen menu to be displayed in common for the plurality of specific users and a personal screen menu item for displaying the acquired provision information item;

transmitting the produced screen information to the user terminal for use by the arbitrary user to cause the screen information to be displayed by the user terminal;

determining whether or not a user terminal for use by the arbitrary user was used in a predetermined time period, based on the use time information included in the terminal use information stored in the terminal use information storing unit;

making, when it is determined that the user terminal for use by the arbitrary user was not used, a report indicating that the user terminal was not used; and changing the predetermined time period in accordance with a number of reports each of which is made when it is determined that the user terminal for use by the arbitrary user was not used.

* * * * *